US012576913B2

(12) United States Patent
Nagasaki

(10) Patent No.: US 12,576,913 B2
(45) Date of Patent: Mar. 17, 2026

(54) VEHICLE

(71) Applicant: TOYOTA JIDOSHA KABUSHIKI KAISHA, Toyota (JP)

(72) Inventor: Yuta Nagasaki, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 378 days.

(21) Appl. No.: 18/207,337

(22) Filed: Jun. 8, 2023

(65) Prior Publication Data

US 2023/0399053 A1      Dec. 14, 2023

(30) Foreign Application Priority Data

Jun. 14, 2022      (JP) ................................. 2022-095829

(51) Int. Cl.
*B62D 21/15* (2006.01)
*B60R 19/34* (2006.01)

(52) U.S. Cl.
CPC ............ *B62D 21/152* (2013.01); *B60R 19/34* (2013.01)

(58) Field of Classification Search
CPC ........ B60R 19/34; B60R 21/152; B60R 25/08
See application file for complete search history.

(56) References Cited

U.S. PATENT DOCUMENTS

RE1,213 E * 7/1861 Seely ............................ 105/401
2003/0025358 A1 2/2003 Taguchi et al.

2010/0127531 A1* 5/2010 Yasuhara ............. B62D 21/152
296/187.09
2014/0354008 A1* 12/2014 Sakakibara .......... B62D 21/152
296/187.1
2017/0113735 A1* 4/2017 Kawabe ................. B60R 19/02
2017/0151919 A1* 6/2017 Kashiwagi ............. B60R 19/34
2019/0232903 A1* 8/2019 Newcomb ............. B29C 66/547

FOREIGN PATENT DOCUMENTS

| | | |
|---|---|---|
| JP | 2003-040142 A | 2/2003 |
| JP | 2010-125884 A | 6/2010 |
| JP | 2013-032040 A | 2/2013 |
| JP | 2014-227154 A | 12/2014 |
| SE | 9003006 A * | 3/1992 |

* cited by examiner

*Primary Examiner* — Lori Lyjak
(74) *Attorney, Agent, or Firm* — Dinsmore & Shohl LLP

(57) ABSTRACT

A vehicle includes wheels including a front wheel, a front side member extending in a vehicle front-rear direction on an inward side of the front wheel in a vehicle right-left direction, an upper member including a first section extending in the vehicle front-rear direction above the front wheel in a vehicle up-down direction, and a second section extending downward in the vehicle up-down direction forward of the front wheel in the vehicle front-rear direction, and a linking plate positioned forward of the front wheel in the vehicle front-rear direction and that links a front end of the front side member and the second section of the upper member to each other. The linking plate is made of a single plate material, and is corrugated in shape, in which ridges and grooves that extend in the vehicle right-left direction are fashioned alternating along the vehicle up-down direction.

4 Claims, 5 Drawing Sheets

VEHICLE

CROSS-REFERENCE TO RELATED APPLICATION

This application claims priority to Japanese Patent Application No. 2022-095829 filed on Jun. 14, 2022, incorporated herein by reference in its entirety.

BACKGROUND

1. Technical Field

The present disclosure relates to a vehicle.

2. Description of Related Art

A vehicle is described in Japanese Unexamined Patent Application Publication No. 2003-040142 (JP 2003-040142 A). In this vehicle, a front side member and an upper member are linked using a plurality of members.

SUMMARY

Linking the front side member and the upper member as in the vehicle described above enables strength of forward corner portions of the vehicle to be effectively increased with respect to a frontal collision of the vehicle. However, a structure in which these two members are linked by a plurality of members complicates the configuration and manufacturing process of the vehicle.

The present disclosure provides technology for improving strength of forward corner portions of a vehicle by a simple configuration.

A vehicle according to a first aspect of the present disclosure includes wheels including a front wheel, a front side member that extends in a vehicle front-rear direction on an inward side of the front wheel in a vehicle right-left direction, an upper member that includes a first section extending in the vehicle front-rear direction above the front wheel in a vehicle up-down direction, and a second section extending in the vehicle up-down direction forward of the front wheel in the vehicle front-rear direction, and a linking plate that is positioned forward of the front wheel in the vehicle front-rear direction and that links a front end of the front side member and the second section of the upper member to each other. The linking plate is made of a single plate material, and is corrugated in shape, in which ridges and grooves that extend in the vehicle right-left direction are fashioned alternating along the vehicle up-down direction.

In the above-described vehicle, the linking plate that links the front side member and the upper member to each other is made of a single plate material. The linking plate has a corrugated shape in which the ridges and the grooves that extend in the vehicle right-left direction are formed alternating along the vehicle up-down direction. According to such a configuration, the strength of the forward corner portions of the vehicle can be improved with a simple configuration.

The linking plate may include an inward region joined to the front end of the front side member, an outward region joined to the second section of the upper member, and an intermediate region positioned between the inward region and the outward region. In this case, the ridges and the grooves may be fashioned at least from the intermediate region to the outward region. According to such a configuration, the front side member and the upper member can be linked with high rigidity.

The vehicle may further include a crash box attached to the front end of the front side member. In this case, the inward region of the linking plate may be sandwiched between the front end of the front side member and the crash box. According to such a configuration, the linking plate is firmly supported by the front side member.

The vehicle may further include an accessory device attached to the linking plate. According to such a configuration, doubling usage of the linking plate as a bracket for attaching the accessory device as well enables the number of parts of the vehicle to be reduced.

The accessory device may be a pump configured to circulate a coolant. In this case, at least part of the pump may be positioned inside at least one of the grooves fashioned in the linking plate. According to such a configuration, limited space inside the vehicle can be effectively utilized.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
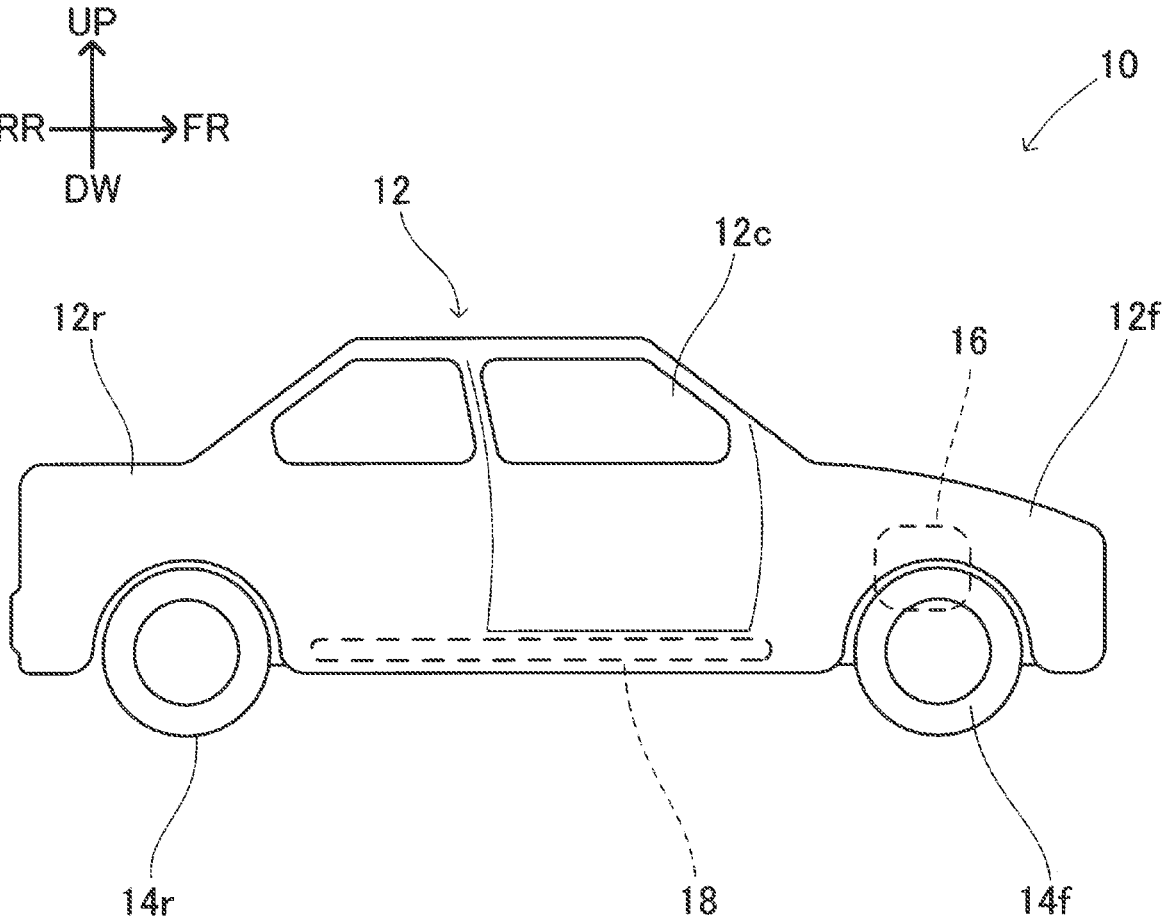
FIG. 1 is a side view schematically illustrating a vehicle 10 according to an embodiment.

A vehicle 10 according to an embodiment will be described with reference to the drawings. Note that in the drawings attached to this application, a direction FR indicates forward in a vehicle front-rear direction, and a direction RR indicates rearward in the vehicle front-rear direction. A direction LH indicates leftward in a vehicle right-left direction, and a direction RH indicates rightward in the vehicle right-left direction. A direction UP indicates upward in a vehicle up-down direction, and a direction DW indicates downward in the vehicle up-down direction. The vehicle front-rear direction and the vehicle right-left direction are directions parallel to a road surface, and are orthogonal to each other. The vehicle up-down direction is a direction that is perpendicular to the road surface, and that is orthogonal to the vehicle front-rear direction and the vehicle right-left direction.

As illustrated in FIG. 1, the vehicle 10 is a vehicle that travels over the road surface, and includes a vehicle body 12 and a plurality of wheels 14$f$ and 14$r$ that supports the vehicle body 12. The wheels 14$f$ and 14$r$ include a pair of front wheels 14$f$ and a pair of rear wheels 14$r$. The front wheels 14$f$ are positioned at a front portion 12$f$ of the vehicle body 12. The rear wheels 14$r$ are positioned at a rear portion 12$r$ of the vehicle body 12. The vehicle body 12 has a cabin 12$c$ between the front portion 12$f$ and the rear portion 12$r$.

The vehicle body 12 is primarily made of metal material, although not limited thereto in particular.

The vehicle 10 according to the present embodiment is a battery-powered electrified vehicle and includes a battery pack 18 and a traction motor 16, although not limited thereto in particular. The battery pack 18 is a power source that supplies electric power to the traction motor 16, and is disposed below the cabin 12*c*. The traction motor 16 is disposed at the front portion 12*f* of the vehicle body 12, and is configured to drive the front wheels 14*f*. The vehicle 10 may further include a power conversion device including a direct current (DC)-to-DC converter and/or an inverter between the battery pack 18 and the traction motor 16, although these are omitted from illustration. It should be noted that the configuration of the vehicle 10 described in the present specification is not limited to battery-powered electrified vehicles, and can be applied to various types of vehicles, such as hybrid electric vehicles, plug-in hybrid electric vehicles, fuel cell electric vehicles, and engine vehicles.

Figure 2:
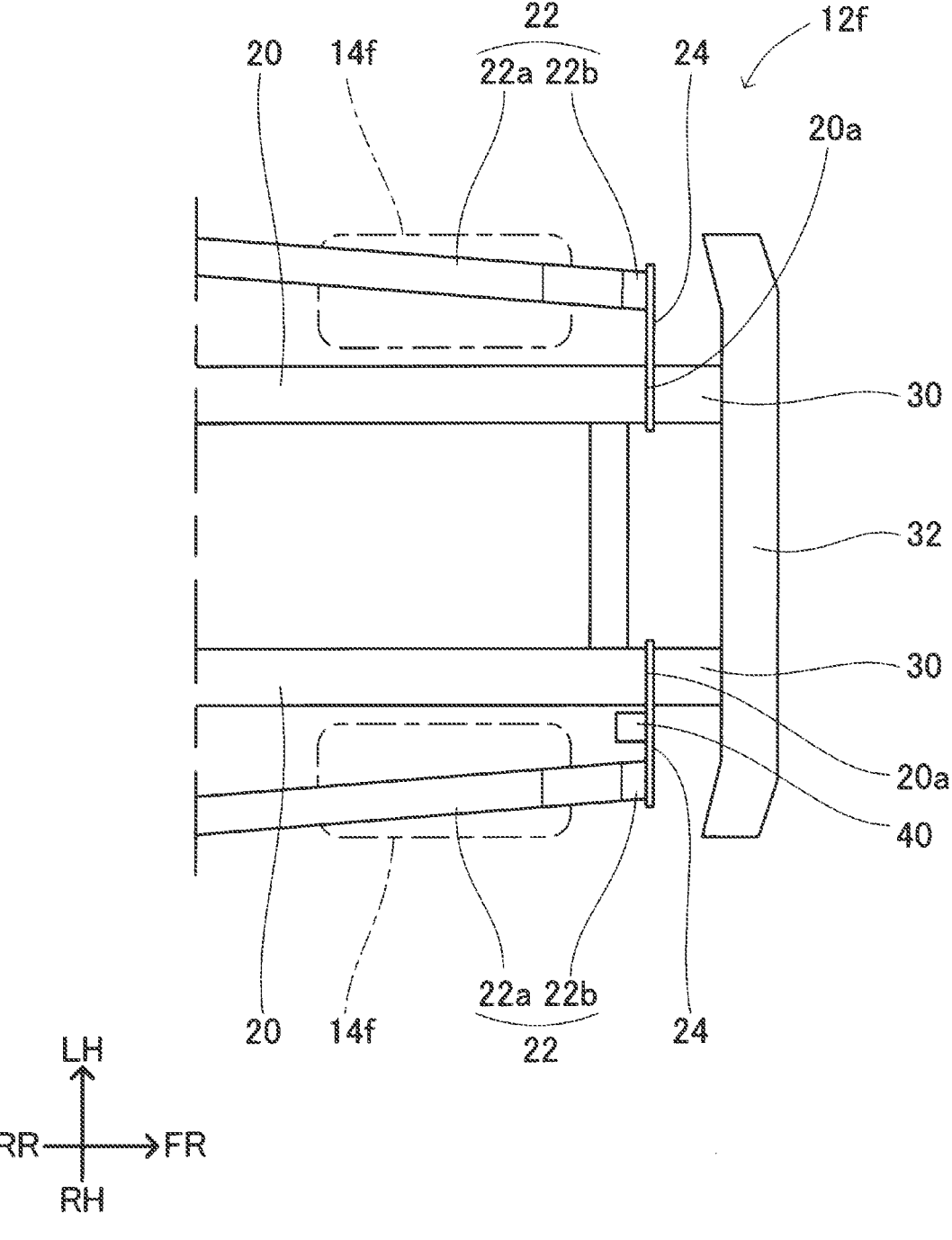
FIG. 2 is a plan view illustrating principal portions of a front portion 12$f$ of a vehicle body 12.

As illustrated in FIG. 2, the vehicle body 12 of the vehicle 10 includes a pair of front side members 20, a pair of upper members 22, and a pair of linking plates 24. The front side members 20, the upper members 22, and the linking plates 24 are positioned at the front portion 12*f* of the vehicle body 12, and are symmetrically provided in the right-left direction of the vehicle. Below, a right side portion of the front portion 12*f* of the vehicle body 12 will be described representatively, and description of a left side portion will be omitted.

As illustrated in FIGS. 2 to 5, the front side member 20 extends in the vehicle front-rear direction, on an inward side of (i.e., leftward from) the front wheel 14*f* in the vehicle right-left direction. The front side member 20 is a primary framework member of the vehicle body 12, and is made of an elongated member having a predetermined cross-sectional shape, such as a square pipe member, a channel member, or a hat-like-shaped member. A crash box 30 and a front bumper reinforcement 32 are attached to a front end 20*a* of the front side member 20. The crash box 30 is positioned between the front end 20*a* of the front side member 20 and the front bumper reinforcement 32. The crash box 30 absorbs collision energy by exhibiting compression deformation when the vehicle 10 encounters a frontal collision.

The upper member 22 extends forward from above the front wheel 14*f*, and has a first section 22*a* and a second section 22*b*. The first section 22*a* extends in the vehicle front-rear direction above the front wheel 14*f*. The second section 22*b* extends in the vehicle up-down direction forward of the front wheel 14*f*. The upper member 22 is a primary framework member of the vehicle body 12, and is made of an elongated member having a predetermined cross-sectional shape, such as a square pipe member, a channel member, or a hat-like-shaped member. A panel material is provided between the upper member 22 and the front side member 20 to define a wheelwell that accommodates the front wheel 14*f* and suspension thereof, although omitted from illustration.

The linking plate 24 is positioned forward of the front wheel 14*f*, and links the front end 20*a* of the front side member 20 and the second section 22*b* of the upper member 22 to each other. By these two members 20 and 22 being linked to each other forward of the front wheel 14*f* in this way, strength of forward corner portions of the vehicle body 12 can be effectively increased with respect to a frontal collision of the vehicle 10. Note that the linking plate 24 according to the present embodiment is positioned forward of the second section 22*b* of the upper member 22. However, in another embodiment, the linking plate 24 may be positioned rearward from the second section 22*b* of the upper member 22.

The linking plate 24 is made up of a single plate material. Note that the material making up this plate material may be a metal material, although not limited thereto in particular. The linking plate 24 has a corrugated shape. That is to say, a plurality of ridges 26 and grooves 28 that extends in the vehicle right-left direction are formed on the linking plate 24 alternating along the vehicle up-down direction. According to such a configuration, rigidity of the linking plate 24 is increased, whereby the front side member 20 and the upper member 22 can be linked with high rigidity.

Figure 5:
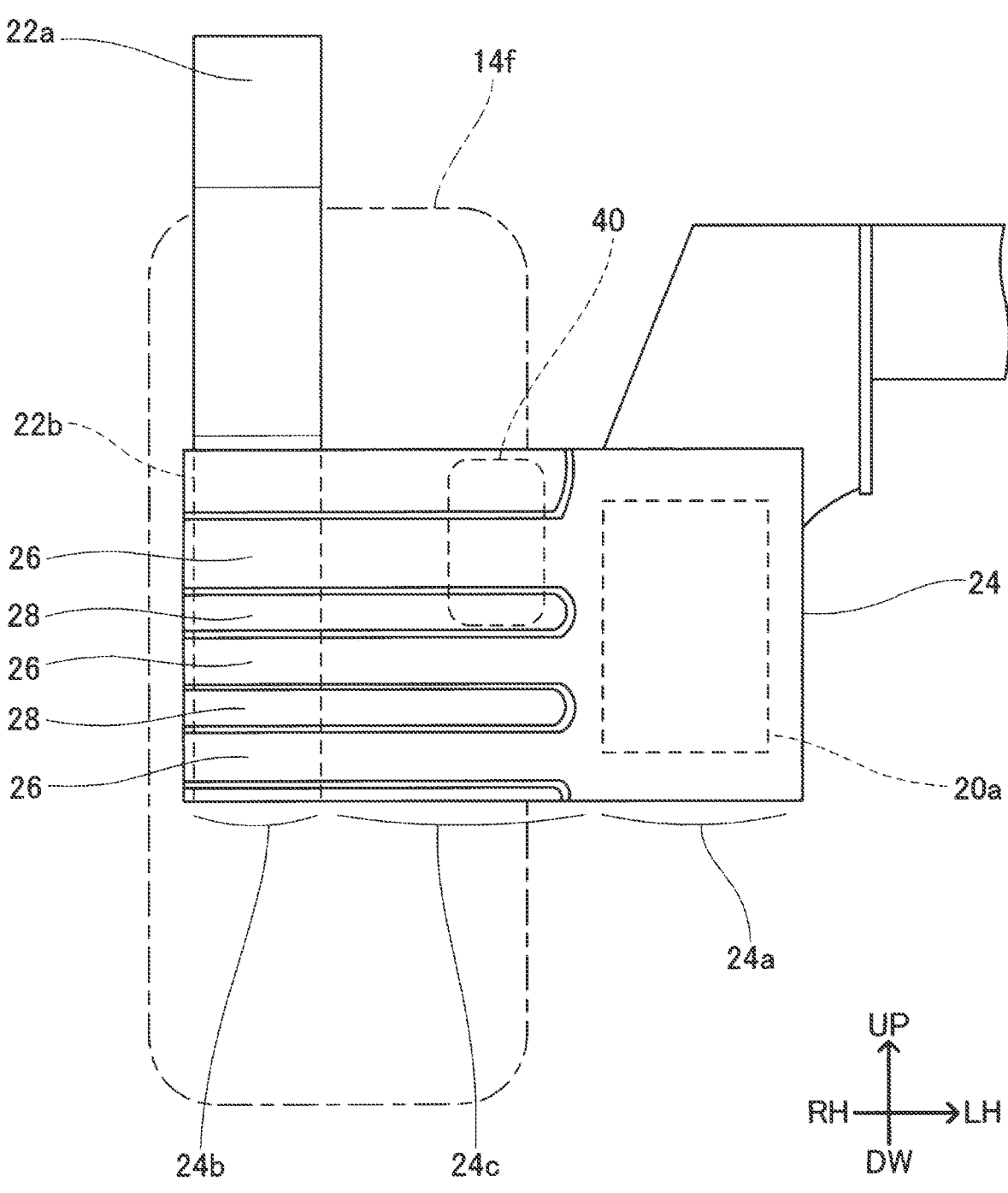
FIG. 5 is a frontal view illustrating principal portions of the right side portion of the front portion 12$f$ of the vehicle body 12.

The linking plate 24 can be divided into an inward region 24*a*, an outward region 24*b*, and an intermediate region 24*c*, as viewed from the front (see FIG. 5). The inward region 24*a* is a region joined to the front end 20*a* of the front side member 20. The outward region 24*b* is a region joined to the second section 22*b* of the upper member 22. The intermediate region 24*c* is a region positioned between the inward region 24*a* and the outward region 24*b*. The ridges 26 and the grooves 28 are formed from the intermediate region 24*c* to the outward region 24*b* of the linking plate 24 according to the present embodiment, although not limited thereto in particular. Forming the ridges 26 and the grooves 28 thus, not only in the intermediate region 24*c* but also in the outward region 24*b* and/or the inward region 24*a*, enables the front side member 20 and the upper member 22 to be linked with even higher rigidity.

Figure 3:
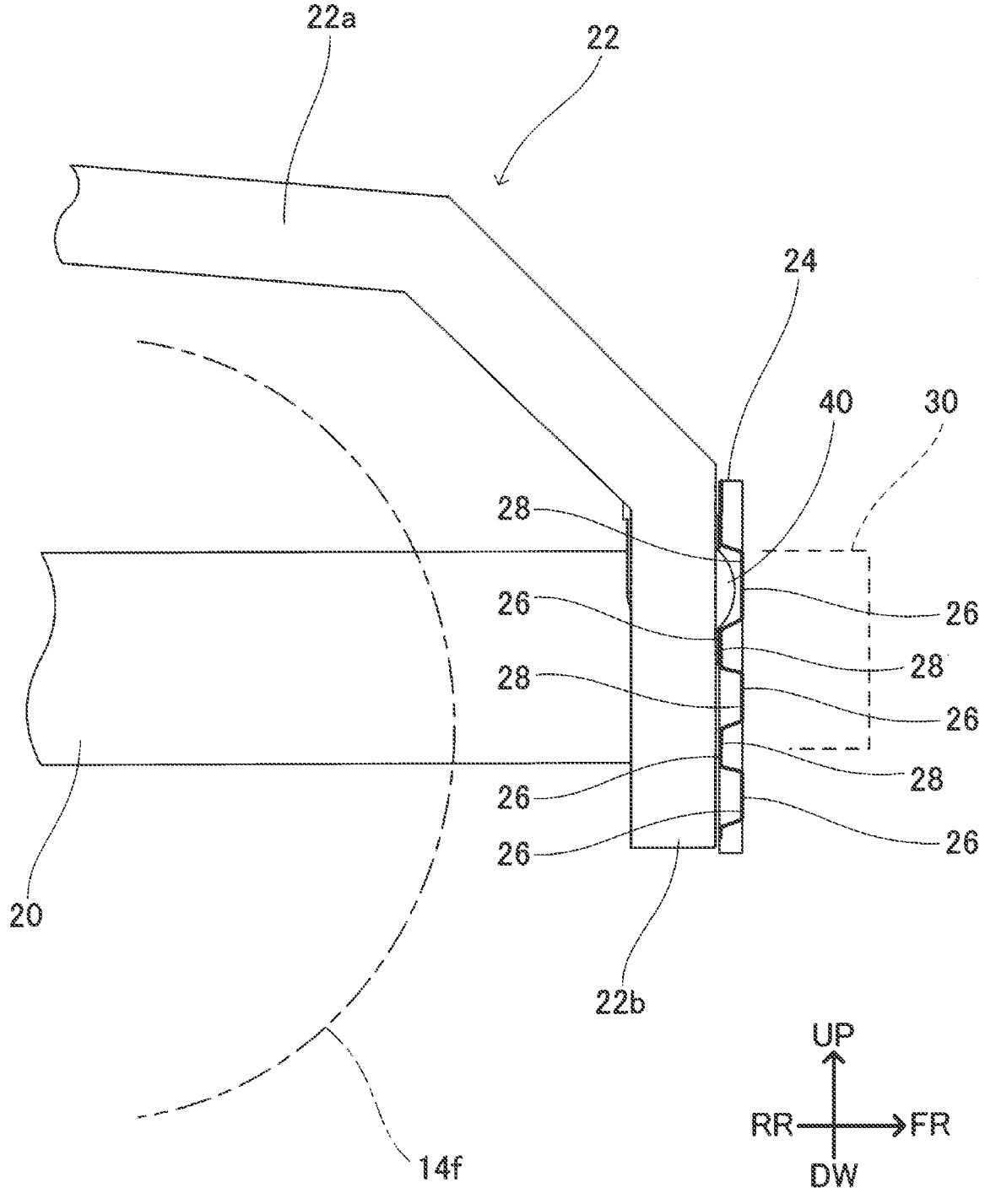
FIG. 3 is a side view illustrating principal portions of a right side portion of the front portion 12$f$ of the vehicle body 12.
Figure 4:
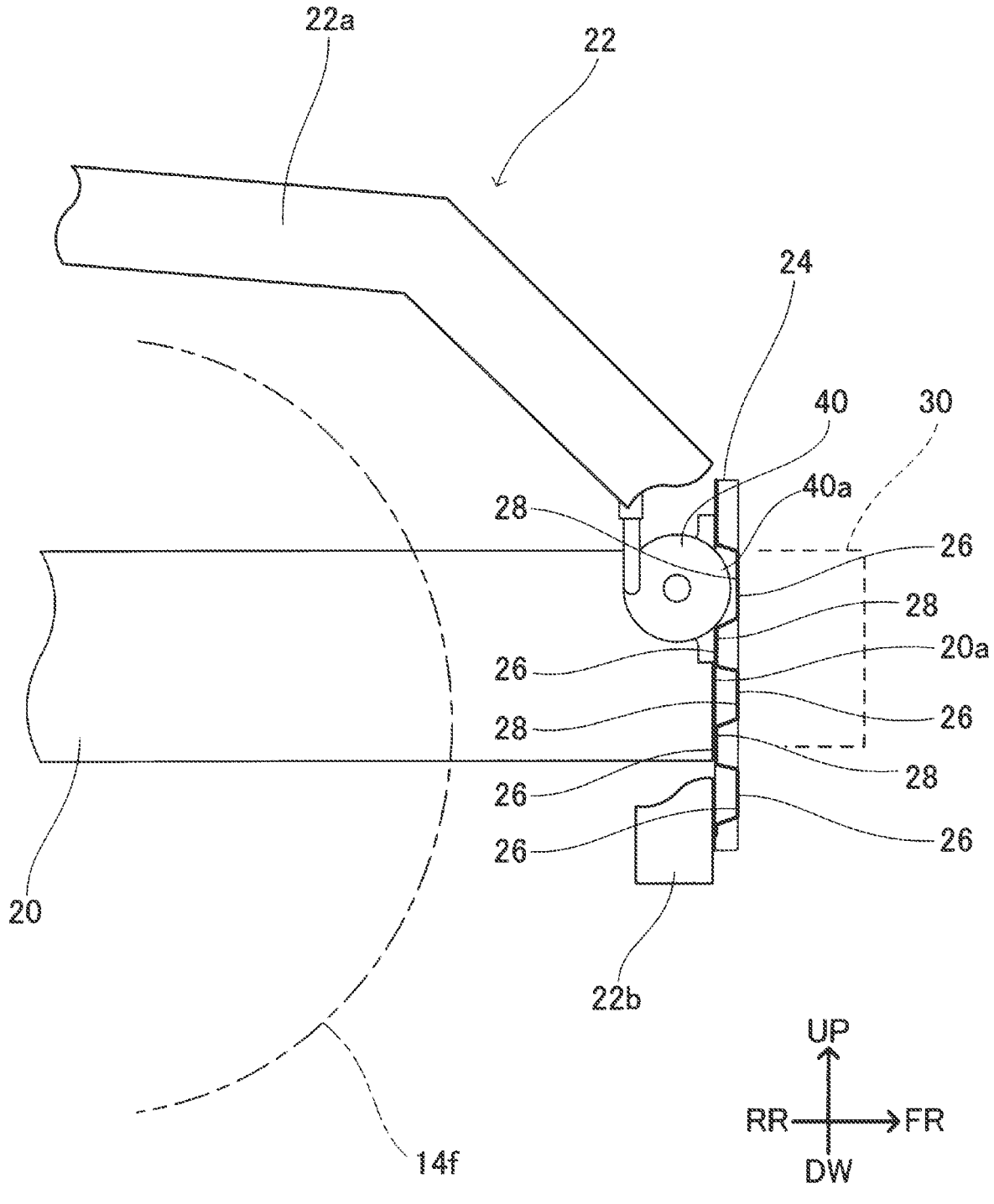
FIG. 4 is a diagram in which part of an upper member 22 is omitted from the side view of FIG. 3.

As described above, the crash box 30 is attached to the front end 20*a* of the front side member 20 (see FIGS. 2 to 4). With respect to this point, the linking plate 24 (particularly the inward region 24*a* thereof) is fastened together with the crash box 30 to the front end 20*a* of the front side member 20. Accordingly, the inward region 24*a* of the linking plate 24 is sandwiched between the front end 20*a* of the front side member 20 and the crash box 30. According to such a configuration, the linking plate 24 is firmly supported by the front side member 20, and accordingly the front side member 20 and the upper member 22 are linked with even higher rigidity.

As illustrated in FIG. 4, a pump 40 is attached to the linking plate 24. The pump 40 is one of accessory devices of the vehicle 10 and is a device that circulates coolant. The pump 40 is also referred to as a water pump. Doubling usage of the linking plate 24 as a bracket for attaching the pump 40 as well enables the number of parts of the vehicle to be reduced. In addition, a portion 40*a* of the pump 40 bulges toward the linking plate 24, and is positioned inside one of the grooves 28 formed in the linking plate 24. According to such a configuration, limited space inside the vehicle 10 can be effectively utilized. It should be noted that other types of accessory devices, in place of or in addition to the pump 40, may be attached to the linking plate 24.

While specific examples of the present disclosure have been described in detail above, these are merely exemplary, and are not intended to limit the scope of the claims. The technology described in the claims includes various modifications and alterations of the specific example illustrated above. Technical elements described in the present specification or illustrated in the drawings exhibit technical utility alone or in various combinations, and are not limited to the combination described in the claims as filed. Also, the technology exemplified in the present specification or in the drawings may achieve a plurality of objects at the same time, and has technical utility by achieving one of such objects.

What is claimed is:

1. A vehicle comprising:

wheels including a front wheel;

a front side member that extends in a vehicle front-rear direction on an inward side of the front wheel in a vehicle right-left direction;

an upper member that includes a first section extending in the vehicle front-rear direction above the front wheel in a vehicle up-down direction, and a second section extending in the vehicle up-down direction forward of the front wheel in the vehicle front-rear direction;

a linking plate that is positioned forward of the front wheel in the vehicle front-rear direction and that links a front end of the front side member and the second section of the upper member to each other; and an accessory device attached to the linking plate, wherein the linking plate is made of a single plate material, and is corrugated in shape, in which ridges and grooves that extend in the vehicle right-left direction are fashioned alternating along the vehicle up-down direction.

2. The vehicle according to claim 1, wherein:

the linking plate includes:

an inward region joined to the front end of the front side member;

an outward region joined to the second section of the upper member; and an intermediate region positioned between the inward region and the outward region, and the ridges and the grooves are fashioned at least from the intermediate region to the outward region.

3. The vehicle according to claim 2, further comprising a crash box attached to the front end of the front side member, wherein the inward region of the linking plate is sandwiched between the front end of the front side member and the crash box.

4. The vehicle according to claim 1, wherein:

the accessory device is a pump configured to circulate a coolant; and at least part of the pump is positioned inside at least one of the grooves fashioned in the linking plate.

* * * * *